United States Patent [19]
Dominguez

[11] Patent Number: 5,987,713
[45] Date of Patent: Nov. 23, 1999

[54] METAL BRACKET WITH SCREW FOR ITS CLAMPING

[75] Inventor: Ramon Palau Dominguez, Barcelona, Spain

[73] Assignee: Mikalor, S.A., Barcelona, Spain

[21] Appl. No.: 09/043,920

[22] PCT Filed: Jul. 31, 1997

[86] PCT No.: PCT/ES97/00203

§ 371 Date: Aug. 5, 1998

§ 102(e) Date: Aug. 5, 1998

[87] PCT Pub. No.: WO98/06969

PCT Pub. Date: Feb. 19, 1998

[30] Foreign Application Priority Data

Aug. 13, 1996 [ES] Spain ..................................... 9601868

[51] Int. Cl.$^6$ ............... F16L 33/08; B65D 63/00
[52] U.S. Cl. ........................................ 24/274 R; 24/279
[58] Field of Search ..................... 24/274 R, 20 T, 24/20 R, 23 EE, 20 CW, 279; 285/367, 406, 252, 253

[56] References Cited

U.S. PATENT DOCUMENTS

| | | |
|---|---|---|
| 2,944,314 | 7/1960 | Black . |
| 3,371,392 | 3/1968 | Rueckheim ........................... 24/274 R |
| 3,914,832 | 10/1975 | Petrus ................................... 24/274 R |
| 3,950,830 | 4/1976 | Duprez .................................. 24/274 R |
| 4,257,149 | 3/1981 | Sydendal .............................. 24/274 R |
| 4,473,928 | 10/1984 | Johnson . |
| 4,528,730 | 7/1985 | Spaulding . |
| 4,706,346 | 11/1987 | Verges . |
| 4,956,898 | 9/1990 | Miyamura et al. ................... 24/274 R |
| 5,315,737 | 5/1994 | Ouimet . |
| 5,473,798 | 12/1995 | Baumann et al. . |
| 5,560,087 | 10/1996 | Marques . |
| 5,682,651 | 11/1997 | Sauer .................................... 24/274 R |

FOREIGN PATENT DOCUMENTS

| | | |
|---|---|---|
| 25 06 589 | 8/1976 | Germany ............................. 24/274 R |
| 4 108852A1 | 9/1992 | Germany . |
| 80296 | 8/1955 | Netherlands . |
| 708444 | 5/1954 | United Kingdom . |
| 2112051 | 7/1983 | United Kingdom ................. 24/274 R |

Primary Examiner—James R. Brittain
Assistant Examiner—Robert J. Sandy
Attorney, Agent, or Firm—Dennison, Meserole, Scheiner & Schultz

[57] ABSTRACT

Improvements to the construction of metal brackets with screw for the clamping or tightening thereof, the vertices of the extremities of the two arms of the front cross-bar at the body-tunnel entrance are enlarged, and a space is provided for the housing thereof into the screw body, with concentric bearing flange and double clamping tailpiece of the two ends of the metal strip coiled from the tunnel base being substituted by a transverse monotailpiece which is rabated to the opposite side, with a threaded tongue for clasping purposes, and one of the extremities of the strip having two juxtaposed drawn pieces, one in the upper surface and the other one in the lower surface of crimping with the edge of the transverse monotailpiece, the upper one impeding the excessive elevation of the proper extremity.

5 Claims, 2 Drawing Sheets

METAL BRACKET WITH SCREW FOR ITS CLAMPING

The subject of the present invention relates to improvements made in the construction of metal clips or clamps with tightening screw for securing them.

This type of clip is known at present, the clips being essentially constituted by a metal strip having permanently joined to one of its ends a tunnel-like body to house the screw.

The metal strip constituting the clip has near the opposite end to that described a multiplicity of transverse, inclined slots, parallel to one another, which do not reach the edges of the longitudinal sides of the strip and act as the teeth of a rack.

Such clips are assembled by coiling the metal strip onto itself, forming a loop, and the free end of the strip is inserted into the space existing between the open base of the body of the tunnel and the surface of the end to which the tunnel carrying the tightening screw is permanently joined.

By means of this insertion, the helical threads of the screw, projecting through the open base of the tunnel, mesh rotationally in the inclined transverse slots, parallel to one another, of the inserted free end of the strip, and on turning the screw in its tightening movement they push the intermediate walls between two slots and thus the end of the strip is pulled or pushed, depending on the direction in which the screw is turned, and by this means the constriction or loosening of the loop is effected.

The separation between juxtaposed slots of the free end of the metal strip coincides with the pitch of the screw threads of the screw.

Near the lower edges of the major sides of the sheet from which the tunnel carrying the screw is formed there are two longitudinal slots parallel to the said edges for the purpose of narrowing at the said point the amplitude of the separation existing between the descending walls of the tunnel, bringing them closer to the body of the screw, and also in order to provide greater resistance to negative warping thereof.

The head of the screw inserted inside the tunnel body is arranged on the outside of the inner chamber which the latter forms for housing the body of the tunnel screw, the said head bearing against the forward edge of the fixing transverse member placed on the inlet opening of the said chamber.

The fixing transverse member is constituted by two limbs sharply bent in a direction towards each other and their free faces are opposed, touching each other.

These bent limbs start perpendicularly from the minor lateral ends of the stamped metal strip which forms the tunnel body for housing the tightening screw, and they are then sharply bent.

In order to achieve the above-mentioned advance of the free end of the metal strap of the clip, it is necessary to apply the couple of force to the head of the screw, located outside the housing chamber, in a clockwise direction, so that the rear surface of the said head presses firmly against the edge of the fixing transverse member of the screw housing, and at the same time entrains, with its helical screw threads, the end of the metal strip.

With the strong transverse pressure of the rear part of the outer head of the screw which has its body housed inside the chamber during the tightening phase, it often occurs that the ends of the transverse limbs, sharply bent towards each other, which constitute the fixing transverse member, are forcibly displaced laterally, which is detrimental to the proper functioning of the device.

It is a consequence of its narrowness that it offers insufficient resistance to the strong perpendicular thrust of the rear part of the head of the screw.

The negative lateral displacement of the ends of the bent limbs prevents the correct rotational coaxial sliding of the screw as it moves forwards or backwards, resulting in lateral deviation of the screw from the coaxial line of its housing, and as a consequence of this all the force of the load applied against the fixing transverse member is converted into an asymmetrical force, and therefore there arises the negative deviation from the parallel of the body of the screw in relation to the inner wall of the housing tunnel.

The above-mentioned deviation of the body of the screw deforms, under pressure, the actual casing of its housing and, when the action of tightening the screw is continued, this deformation incorrectly allows the entry of the head of the screw itself, and its larger dimensions then press against the inner walls of the tunnel, deforming them even more and causing the body of the tunnel to break and become detached from the point at which it is connected to the appropriate end of the strip.

Therefore, since there is the possibility that during the operation of the clip the screw, in its tightening phase, may adopt an inclined position relative to the axis of the tunnel, it is normal and current practice in the industry manufacturing clips of this type to provide two more rectangular slots, arranged in the transverse direction of the tunnel, placed near the edge of the front face of the tunnel forming the chamber for housing the screw.

Such additional slots each start on the side near the bending point of the limbs which, once bent towards each other, act as a bearing cross member for the outer head of the screw, the body of which is inserted.

The depth of the aforesaid additional slots is greater at their point of origin, and they decrease in depth towards the centre of the sheet, which coincides with the natural arc forming the tunnel, and they disappear at the vertex of the latter.

These additional slots provided transversely in the body of the walls of the tunnel of this type of clip serve the purpose of partially and transversely constricting the inner space behind the bent limbs, existing between the lower edges of the two sides of the inlet of the tunnel in order to bring the constricted walls closer to the shank of the body of the inserted screw, thus providing the latter with two opposed points of contact and coaxial guiding.

Therefore, as regards the bent limbs, their narrowness is conditioned by the separation existing between the surface of the rear base of the head of the screw and the termination, near the said point, of the end of the continuous, screw-threaded helix of the screw itself.

A consequence of this is another additional problem in that, since the bent limbs are narrow, their free ends do not have sufficient strength to resist the very strong thrust of the head of the screw which presses perpendicularly against their edges.

In order to avoid this problem, in the industry it has been proposed to reinforce the aforesaid bent limbs, providing them with a greater thickness.

This solution is not possible, since it should not be forgotten that the limbs bent in a transverse direction form part of the same laminar metal plate which is then shaped into a tunnel and therefore they can have only the same thickness as the remainder of the stamped sheet.

Owing to this, in the industry the transverse bent limbs continue to be produced, without any increase in thickness and with the upper surface of the bent limbs having a slight inclination from the forward edge to their opposed rear edge, having at a specific point, coinciding with the pitch between turns, a perpendicular prong arising from the rear edge of each limb so that it coincides in position with the pitch of the last turn near the rear part of the inserted screw and these serve as rotational and guiding anchorage projections for the latter.

Since the perpendicular prongs are weak and small, nor are they completely effective for their function of rotational engagement between the pitch of two turns of the screw, and owing to the strong pressures which develop in the said area on applying the couple of force to the head of the screw, they break and disappear.

Moreover, the loop of the metal strip which clips of this type form, sometimes, although too frequently, continues to come off accidentally when the loop undoes itself, through the escape of the end inserted between the screw and the body coiled onto itself, is a consequence of the high tensile force of the screw in its actual action of constraining the strip forming a loop.

On the other hand, in the clip industry there have been proposed different forms of fixing of the tunnel to the end of the metal strip, but frequently, owing to the said strong tensions, the joint obtained is destroyed, the clip being rendered useless.

Registrations of this known type which may be cited, among many other national and foreign registrations, are: Spanish Utility Model No. 281 033 of the company Mikalor S.A. (corresponding to U.S. Pat. No. 4,706,346 and to European Patent No. 171 481 of the said Mikalor S.A.); U.S. Pat. No. 4,473,928 of Francis W. Johnson; British Patent 708 444 of Doye; U.S. Pat. No. 2,944,314 of Brack; U.S. Pat. No. 4,528,730 of George E. Spaulding; Dutch Patent No. 80 296 of Schendelen, and many others, such constructional details being different from one another and that of the related registrations of the Applicant.

Therefore, in spite of the variations in detail provided in the related registrations, in all of the clips with the head piece for housing the tightening screw, the production of the clip belonging to the said type in the public domain involves basically the same problems, more or less acute, arising from the fact of being the said common type of clip.

With the subject of the improvements of the invention, the result achieved is that the ends of the transverse limbs, sharply bent and with their faces opposite one another and contacting one another, which form the fixing transverse member, can be constructed with a greater width, gaining in resistance to the perpendicular thrust of the rear part of the head of the screw during the tightening action of the latter.

This increase in width also makes it possible to increase the inclined surface existing between one edge and the other of the sides of the two bent limbs facing one another, and thereby obtain an improved anchorage of the ends of the two bent limbs which permit the rotational movement upon itself of the screw.

It should be borne in mind that the inclination in a transverse direction of the bent limbs is of extreme importance in this known type of clip.

On the one hand it facilitates the introduction of the rear edge of the fixing transverse member formed by the two bent limbs into the pitch between turns of the screwed-in screw, and on the other hand provides an inclined surface for thrust against the end of one of the two superposed at the point of junction of the tunnel body with the end of the coiled strip forming a loop.

It is clear that at present, because the bent limbs are narrow and have insufficient rotational anchorage, it is necessary to arrange on the rear edge weak perpendicular prongs at the above-mentioned point of engagement of the screw, nevertheless permitting it to turn on itself.

However, it should never be forgotten that on the edge of the fixing transverse member at which the tightening of the rear part of the screw is effected, a strong thrust force is exerted, so that with the arrangement of such weak engagement prongs of the rear edge of the two bent limbs a weak resistance is provided compared with that strong thrust force which easily destroys the aforesaid prongs, thus re-initiating the negative lateral deviation of the ends of the sharply bent limbs.

It is clear that with the enlargement imparted to the ends of the bent limbs, one of the improvements of this patent is that of eliminating the weak engagement prongs at the edges of the bent limbs, since it is the actual faces of said lateral edges which, owing to the greater width of the limbs and the improved seating for the latter provided on the body of the screw, can reach the annular vertex of the start of the support collar arranged on the neck of the body of the screw and obtain improved support.

On the other hand, the annular permanently connected collar, since it is not part of the helical screw thread, can be arranged during manufacture of the screw at a convenient height on the latter, the dimensions of the smooth annular seating space for the lateral edge of each enlarged limb on the body of the screw thus being able to be determined as required.

In order to obtain this larger, smooth annular space mentioned, the upper final end of the helical screw thread of the body of the screw is shortened.

On the other hand, because the bearing point of the said rear edge of each limb is a circular collar and not a helical turn, the bearing force against the collar is uniform and not unequal as occurs at present in that the said edge bears against a helically inclined surface, that of the helical screw thread of the screw.

Likewise, in the improvements which are the subject of the invention, means are arranged to avoid the collapse of the walls of the bent limbs which have a side bearing on the annular vertex, under the strong perpendicular pressure on the opposed side of the head of the screw.

Such means contribute even more to avoiding the deformation of the surface of the sharply bent limbs which form the fixing transverse member; on the neck of the screw they consist in arranging another annular collar, with double slope, constituting a narrow-edged circular rim.

This annular collar is placed between the annular collar arranged at the end of the screw thread of the body of the screw and the collar permanently joined to the rear part of the head of the screw itself.

The narrow, annular projecting edges of this additional interposed collar, when gradually introduced, by screwing of the body of the screw, into the housing chamber of the tunnel, exerts simultaneous rotational pressure against the inner side wall of the chamber of the tunnel and against the corresponding bent limb, which simultaneous double pressure prevents the deformation of the walls against which it acts.

All this manifests itself in a greater resistance to deformation when the strong perpendicular thrust of the rear part of the head of the screw is produced, so that according to the improvements of the invention the bent limbs are practically undeformable and it contributes to avoiding the problems of the deformation of the chamber housing the screw.

Also in this type of clip there is likewise the problem that the strip, when it forms a loop and has its free end backing against the lower part of the length of strip arranged beneath the tunnel as a consequence of that same force of rotation of the screw for the constriction of the clip, the said end of the metal strip has a tendency to follow the rotational movement and thus be displaced laterally projecting angularly from beneath the upper superposed length of the strip.

This problem of lateral projection is important in a negative sense, when the clip is fitted in cramped spaces which prevent the free movement of the hands of the operator when they are working and saving in the said cramped place, there being the annoying possibility of producing unpleasant scratches on the hands of the operator, as occurs inside the "bonnets" of motor vehicles.

There is another important problem in the construction of clips of this type, which is that of joining the tunnel to the end of the metal strip.

At present, in order to join the tunnel for housing the tightening screw to the corresponding end of the metal strip, a pair of equal appendages are used which project perpendicularly from each lower edge of the sheet forming the tunnel body, and said perpendicular appendages are bent and depressed respectively, their ends being bent and their faces opposite one another, touching one another in the middle of the space existing between the walls of the open base of the tunnel body, simultaneously clamping the two superposed ends of the coiled metal strip forming a loop.

This composite clamping is weakened by the central dividing line formed by the opposed facets of the two facing appendages.

In order to remedy this weakening of the bent appendages in the known constructions, a perpendicular bracket is caused to project from the lower end of the strip, which simultaneously rises over the two juxtaposed coinciding vertices of each end of both the transverse appendages, which vertices are flattened for improved bearing of the end of the bracket, which is depressed and simultaneously presses against the two flattened points provided by the two juxtaposed vertices of the two transverse appendages.

This additional clamping to avoid, the separation of the two ends of the bent transverse appendages is precarious owing to the strong separating force which is exerted on the free ends of both bent transverse appendages when the tightening screw is tightened.

However, in spite of the said precautions, it often occurs that this manner of joining the tunnel body to the corresponding end of the metal strip cannot prevent the negative lateral displacement of the ends of the said appendages.

Consequently the clip would prove to have to be replaced by another.

Owing to the improvements of the invention, the joining of the tunnel body to the end of the metal strip is not effected in the form disclosed of the two equal bent appendages and the containment bracket, but the joining of the tunnel body to the end of the clip which abuts the edge of the lateral of the same side of a single transverse appendage. And moreover, at the other end of the actual metal strip, it has stops projecting from its surface tending to rise up when the metal strip is pulled, which stops arranged in the recommended manner of the invention prevent the disengagement of the end of the strip.

Also in the improvements of the invention provision is made to impart a greater resistance to the bending of the vertices of the side in which is located the tongue for fastening with the single appendage of the tunnel body. This greater resistance is obtained by providing on the inner surface of each of the two vertices an embossed portion which forms a protuberance on the opposed surface.

An attempt was made to omit the joining with the two equal appendages and the bracket for retaining the latter, owing to the fact that the said joint is weak and a point at which the clips thus formed frequently fail.

This attempt consisted in arranging two transverse folds or steps on one of the two ends of the strip, in order to create a deformation of the level of the upper surface, arranged in a circumferential direction, which forms a cavity of matching shape in the lower surface of that end, so that the facing ends of the two transverse appendages of the tunnel body back against it.

By the said attempt, a weak connection was obtained, since on pulling strongly the connected end of the metal strip coiled on itself to form a loop, this transverse double fold is undone by the strong stretching pressure and thus smooths it, escaping from its engagement with the ends of the two transverse appendages of the tunnel body.

In order to avoid this, in the improvements two consecutive projecting stops are arranged, one on the lower surface of the corresponding length of the metal strip and the other on the opposed surface.

The two stops are obtained by embossing of the strip material of the said end.

The lower embossed portion acts as a stop in transverse action when it is pulled by the said end and butts against the edge of the single appendage of the improvements.

The embossed portion projecting from the surface of the said end also acts as a stop for its elevation caused by the effect of strong traction of the said end, which stop limits the degree of elevation by meeting the inner surface of the superposed strip end at the said point.

This limitation of elevation, since the end rises up to a specific degree of security, prevents the lower stop engaged with the transverse edge of the single appendage from escaping by smoothing of the transverse folds which delimit the stepped seating of the transverse single appendage.

For correct understanding of the subject of the invention, a description will now be given of a practical embodiment, by way of non-limiting example, accompanied by a sheet of drawings in which.

Figure 1:
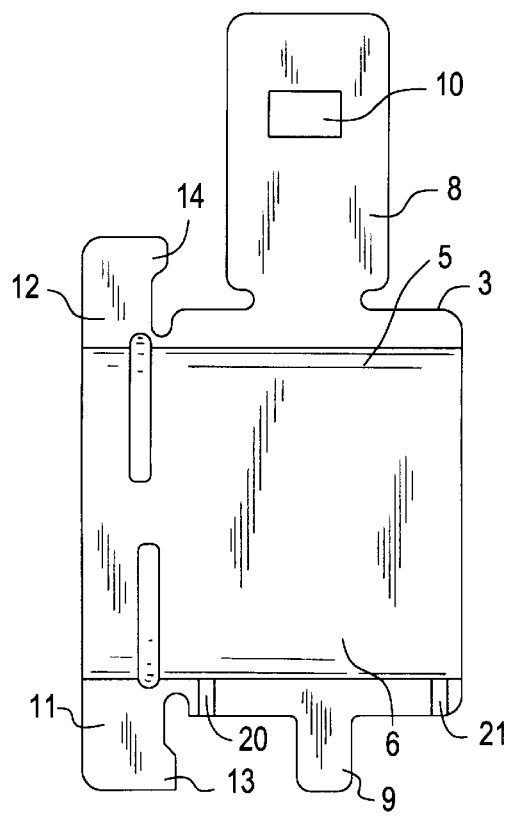
FIG. 1 shows, uncoiled, the stamped metal sheet with which, once it is shaped, there is obtained the tunnel body for housing the tightening screw.
Figure 2:
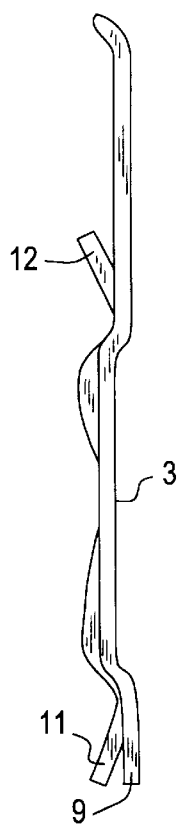
FIG. 2 shows a side view of the actual sheet.
Figure 3:
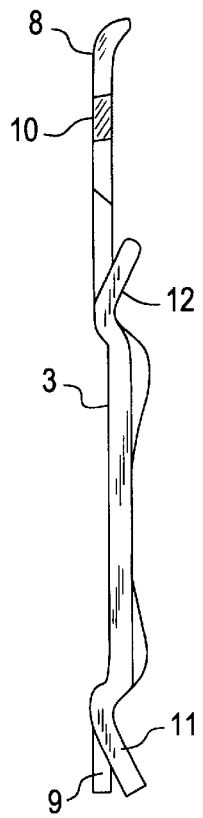
FIG. 3 shows a side view from the opposite side of the actual sheet, partially in section.
Figure 4:
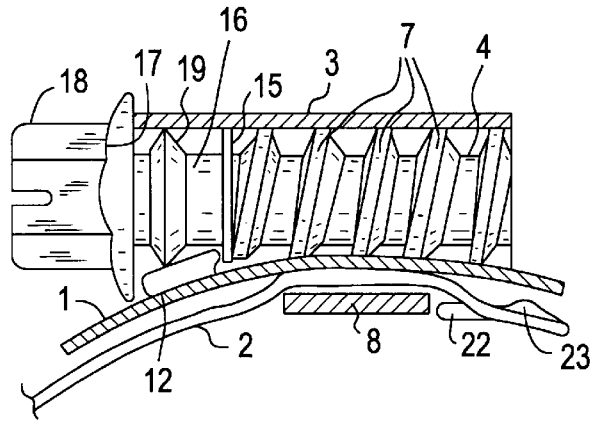
FIG. 4 shows the body of the tunnel for housing the tightening screw, in longitudinal section, so as to be able to observe the presence inside it of the said screw, the two superposed ends of the metal strip, the transverse bent limb, and the single appendage in section simultaneously clamping both superposed ends.
Figure 5:
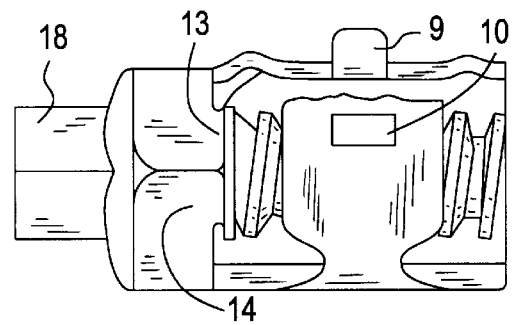
FIG. 5 shows in a plan view from below the single appendage for clamping the two superposed ends of the clip, shortened.
Figure 6:
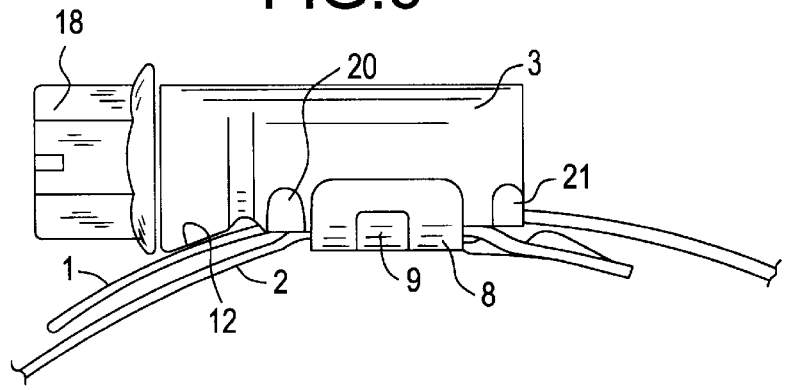
FIG. 6 shows from the outside the head of the tightening screw, the tunnel body, the bent limb and the two superposed, lengths of the ends of the metal strip.
Figure 7:
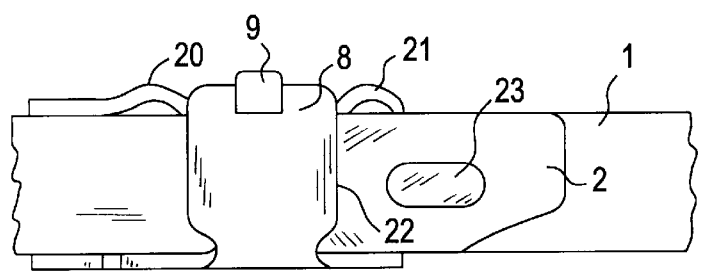
FIG. 7 shows in plan the fastening of the transverse single appendage of a lower edge of a side of the tunnel body, with the flange of the lower edge of the opposed side of the said tunnel body.

The improvements to the clips which are the subject of the invention are to those clips which are of the type formed by a metal strip (1), which has joined to one end (2) a tunnel body (3) for housing the screw (4) for tightening and loosening the constraining loop of the clip, which tunnel body (3) has the ends of its descending vertical walls (5) and (6) separated sufficiently from the edges of the helical screw thread (7) of the tightening screw (4) introduced into the tunnel body (3), the two superposed lengths (1) and (2) of the metal strip, coiled on itself to form a loop, clamped by a common one-piece appendage (8) arranged from one side to the other of the open base of the tunnel body (3) covering the said space and its end projects beyond it, and is then depressed against the opposed side of the lower part of the descending wall of the tunnel body (3).

Moreover, before being bent back, there is inserted into its window a fastening tongue which starts from the opposed edge of the tunnel body itself, and which drops down, and in the actual bending-back operation that of the fastening tongue (9) is effected simultaneously.

In order to be able to impart greater resistance to the lateral thrust of the rear surface of the head of the tightening screw to the limbs (11 and 12) bent in a transverse direction which form the fixing transverse member in the common type of this kind of clip, the inner vertices of the free ends of the said limbs are provided with a widening (13 and 14).

This widening means that in the central part of the space in which they are placed once they are bent, in relation to the body of the screw, they have a greater width. This greater width of course requires a larger seating space interposed between turns of the screw than exists at present in this kind of clip.

In order to be able to produce the said widening there is provided on the body of the screw and near the upper end of the helical screw thread a smooth annular space (16) of larger dimensions than the smooth helical space formed between turns which is left in the present industry to receive such bent limbs.

The greater width means a greater degree of resistance to the pressure in a perpendicular direction provided by the rear surface (17) of the head (18) of the screw (4) against the rear edge of the two bent limbs (11 and 12).

However, this enlargement of the edges of the free ends of the bent limbs increases the possibility that at the said point each limb may bend under the perpendicular pressure of the second collar (17) permanently joined to the head (18) of the tightening screw (4).

In order to avoid irregularities in the lower surface of the head of the screw this is smoothed.

In order to prevent the possibility of involuntary bending of the said area on each limb, a third projecting collar (19) is interposed between the first collar (15) of the body (4) of the screw and the second collar (17) joined inseparably to the head (18) of the screw (4).

This intermediate collar (19) has a double slope, which forms a narrow rim.

The narrow rim is arranged against the wall of each transverse limb (11 and 12) forming part of the fixing transverse member between the start of the limb and its end bearing against the first annular collar (15).

In this way the rim of the interposed collar (19), by its pressure in a direction from inside to outside, prevents the wall of the limb (11) from yielding and being able to bend inwards. Avoiding this bending towards the inside prevents the edge of each bent limb from being separated frown its support provided by the first collar (15).

Since the collar (15) is circular, and not helical as occurs at present in that the rear edges (13 and 14) of the bent limbs (11 and 12) bear against an inclined surface, this support obtained by the circular collar is completely perpendicular, not in an inclined position and the result of the support is much more effective.

On the other hand, the greater width of the bent limbs (11 and 12) and especially at their facing ends (13 and 14) allows the inclination of one edge towards the other opposed edge to be more marked than that existing in the narrow bent limbs known in the industry.

Also with this arrangement there is obtained a larger surface of inclination of the bent limb (11 and 12), which larger surface of inclination also forms a larger contact surface between the outer surface of the limb and the inner surface of the superposed end (1) of the two ends joined at this point of coincidence and thus there is obtained a downward thrusting action of the projecting end (1), overcoming the negative tendency of the said free end to rise up.

With regard to the possibility of escape of the end (1) with which is engaged the fixing transverse member (8) of the base of the tunnel body (3) when the said end is subjected to a strong stretching tension, there are arranged at the said end (2) two embossed portions (22 and 23) produced one behind the other, but each on one of its two opposed surfaces, forming a protuberance (22) on the lower surface of the said length and immediately at the side, but on the upper surface of the same length there is another embossed portion projecting upwards (23), the lower one (22) being a stop when, by stretching the end, the latter meets and presses against the edge of the single appendage (8) for transverse clamping of the two superposed lengths (1 and 2) of the strip, while the upper stop (23) limits the rising movement of the said free end (2) of the metal strip in order to prevent the angle of inclination of that end from being acute and, by its elevation, bringing about the unclamping obtained by the face of the first lower stop (22) clamped with the lateral edge of the single appendage (8) and subsequent negative smoothing of the two transverse steeps, parallel to each other, of the said end of the metal strip.

In addition to the two longitudinal slots near the edge of each side, in order to form with them a reinforcing rib, two embossed portions (20 and 21) are arranged against the inner surface of the end vertices of the side of the tunnel body forming two protuberances in the opposed face seen, which prevent the negative elevation of said vertices by rubbing against hard objects, this independently of the two longitudinal slots of the lower edge of each wall of the screw-carrying tunnel.

In addition to the bending back under pressure of the aforesaid single transverse clamping appendage, in order to provide greater certainty of non-separation of the bent-back portion, there is arranged on the opposite edge from the start of the single appendage a perpendicular flange which, when the single appendage bends in a transverse direction, is inserted into a window provided in the surface of the single appendage, and it bends and overlaps against the edges of the window, and then there is obtained the permanent simultaneous fastening under high pressure, in this way eliminating the bracket, its bending into a hook and the formation of the two rectangular flattened portions, on each juxtaposed vertex of the two known appendages and also the weakness occurring in a transverse direction between the faces of the two equal appendages bent with respect to each other.

In order to prevent one of the ends of the two superposed lengths of strip from projecting laterally and thus the possibility of scratches and cuts being caused during the manipulation of the clips, the vertex of one of the ends, the one which tends to project (1), is bevelled so that its emergence disappears and in addition all the vertices are blunt.

It is understood that in the present case any details of construction and finish which do not alter, change or modify the essence of the invention may be varied.

What is claimed is:

1. In a metal clamp comprising a metal strip having a tunnel body attached at one end thereof with a space between the tunnel body and the strip, the tunnel body formed by a rectangular, stamped and embossed sheet, and at the other end of the strip a plurality of inclined, parallel, transverse slots located between opposed edges of the strip, the other end being constructed and arranged for insertion in the space between the tunnel body and the strip to form a loop of the strip coiled upon itself, the tunnel body receiving a tightening screw having a helical screw thread and a head for moving the strip through the space, superposing the strip upon itself, the tunnel body including a base comprising two transverse appendages for conjoint clamping of the superposed metal strip and a perpendicular bracket for tightening against juxtaposed, flattened vertices, the improvement comprising forming the tunnel body from a sheet comprising a first end having opposed arms provided at ends thereof with a greater width by an enlargement of rear vertices of the ends for reinforcement of a corresponding rear vertex, the screw being adapted to fit said enlargement by omission of the helical thread on a screw portion near said head leaving a smooth annular surface thereon, said smooth annular surface including adjacent the head a first annular collar concentric with a further annular collar with a double slope which forms a concentric narrow annular rim, a single one-piece appendage being arranged at a base of the tunnel body for clamping the superposed metal strip, at the opposite end of the metal strip there being provided two juxtaposed embossed projecting stops arranged in sequence, one of said stops projecting from a lower face of the strip and acting against the single transverse appendage, the other stop projecting from an upper face of the strip which limits rising movement when the other stop meets the superposed strip.

2. The improvement of claim 1, wherein the first collar includes a smoothed lower surface to eliminate projecting irregularities.

3. The improvement of claim 1, wherein the first collar is arranged on a final length of an upper end of the helical screw thread of the screw, the upper end being shortened forming a smooth annular area of the screw for receiving the opposed arms with enlarged ends which thus bear laterally against the a uniform circular seating and not against helical screw thread.

4. The improvement of claim 1, additionally comprising a second concentric collar arranged between said smooth annular surface and the head of the tightening screw, the second concentric collar having a double sloped edge forming a narrow annular rim which presses against an inner surface of each of the opposed arms.

5. The improvement of claim 1, wherein the sheet forming the tunnel body includes a transverse rectangular extension on one side thereof having a window centrally disposed therein, and a transversely extending tongue on the other side thereof, the tongue and window being constructed and arranged to interlock when the sheet is bent to form the tunnel.

* * * * *